(12) United States Patent
Qi et al.

(10) Patent No.: US 11,947,835 B2
(45) Date of Patent: Apr. 2, 2024

(54) HIGH-PERFORMANCE ON-CHIP MEMORY CONTROLLER

(71) Applicant: Black Sesame Technologies Inc., San Jose, CA (US)

(72) Inventors: Zheng Qi, Cupertino, CA (US); Yi Wang, San Jose, CA (US); Yanfeng Wang, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/480,547

(22) Filed: Sep. 21, 2021

(65) Prior Publication Data
US 2023/0090429 A1    Mar. 23, 2023

(51) Int. Cl.
G06F 3/06 (2006.01)
G06F 7/544 (2006.01)
G06F 13/16 (2006.01)

(52) U.S. Cl.
CPC ............ *G06F 3/0658* (2013.01); *G06F 3/061* (2013.01); *G06F 3/0611* (2013.01); *G06F 3/0613* (2013.01); *G06F 3/0659* (2013.01); *G06F 3/0673* (2013.01); *G06F 7/5443* (2013.01); *G06F 13/1621* (2013.01); *G06F 13/1657* (2013.01); *G06F 13/1689* (2013.01)

(58) Field of Classification Search
CPC .. G06F 2212/401; G06F 3/061; G06F 3/0611; G06F 3/0613; G06F 3/0658; G06F 3/0659; G06F 3/0673
See application file for complete search history.

(56) References Cited

U.S. PATENT DOCUMENTS 5,778,419 A     7/1998   Hansen et al.
6,092,071 A *   7/2000   Bolan ................... G06F 3/064
(Continued)

OTHER PUBLICATIONS

Morc: A Manycore-Oriented Compressed Cache by Nguyen (Year: 2015).*

(Continued)

*Primary Examiner* — Paul M Knight
(74) *Attorney, Agent, or Firm* — Fish & Richardson P.C.

(57) ABSTRACT

Methods, systems, and apparatus, including computer programs encoded on computer storage media, for controlling, by an on-chip memory controller, a plurality of hardware components that are configured to perform computations to access a shared memory. One of the on-chip memory controller includes at least one backside arbitration controller communicatively coupled with a memory bank group and a first hardware component, wherein the at least one backside arbitration controller is configured to perform bus arbitrations to determine whether the first hardware component can access the memory bank group using a first memory access protocol; and a frontside arbitration controller communicatively coupled with the memory bank group and a second hardware component, wherein the frontside arbitration controller is configured to perform bus arbitrations to determine whether the second hardware component can access the memory bank group using a second memory access protocol different from the first memory access protocol.

20 Claims, 7 Drawing Sheets

(56) References Cited

U.S. PATENT DOCUMENTS

| | | | | |
|---|---|---|---|---|
| 6,263,413 | B1* | 7/2001 | Motomura | H03M 7/30 |
| | | | | 711/173 |
| 6,310,815 | B1* | 10/2001 | Yamagata | G11C 5/14 |
| | | | | 365/230.03 |
| 6,763,409 | B1* | 7/2004 | Elliott | G06F 3/0658 |
| | | | | 710/72 |
| 6,965,974 | B1* | 11/2005 | Bays | G06F 12/0607 |
| | | | | 711/E12.079 |
| 7,749,191 | B2 | 7/2010 | Truax | |
| 7,925,849 | B2 | 4/2011 | Izumi | |
| 8,654,573 | B2 | 2/2014 | Gillingham et al. | |
| 9,489,314 | B2 | 11/2016 | Chirca et al. | |
| 2002/0171816 | A1* | 11/2002 | Markle | G03F 7/70291 |
| | | | | 710/33 |
| 2003/0052885 | A1* | 3/2003 | Hampel | G09G 5/39 |
| | | | | 345/530 |
| 2003/0204718 | A1* | 10/2003 | Connelly | H04N 21/2347 |
| | | | | 705/50 |
| 2010/0082856 | A1* | 4/2010 | Kimoto | H04L 49/90 |
| | | | | 710/45 |
| 2014/0359219 | A1* | 12/2014 | Evans | G06F 12/023 |
| | | | | 711/118 |
| 2016/0004639 | A1* | 1/2016 | Vorbach | G06F 12/0842 |
| | | | | 711/122 |
| 2017/0286308 | A1* | 10/2017 | Verrilli | G06F 12/0875 |
| 2017/0315944 | A1* | 11/2017 | Mayer | G06F 13/24 |
| 2017/0344304 | A1* | 11/2017 | Alves | G06F 3/0608 |
| 2017/0353708 | A1* | 12/2017 | Petrichkovich | G06T 7/97 |
| 2018/0189641 | A1* | 7/2018 | Boesch | G06N 3/084 |
| 2018/0301123 | A1* | 10/2018 | Appu | G09G 5/393 |
| 2019/0034097 | A1* | 1/2019 | Chang | G06F 13/16 |
| 2019/0310853 | A1* | 10/2019 | Bera | G06F 12/0875 |
| 2020/0227123 | A1 | 7/2020 | Salahuddin et al. | |
| 2022/0179657 | A1* | 6/2022 | Barry | G06F 1/3228 |
| 2022/0197659 | A1* | 6/2022 | Gaur | G06F 9/3877 |

OTHER PUBLICATIONS

AXI Verification IP v1.0 by Xilinx (Year: 2017).*
Efficient Memory Organization for DNN Hardware Accelerator Implementation on PSoC by Navarro Jan. 2021 (Year: 2021).*
CS61C Fall 2014 by Cal (Year: 2014).*
Buses: Front-side and backside by Joch (Year: 2001).*
Understanding Bandwidth and Latency; Ars discusses issues of bandwidth and latency inside hardware architechture by Stokes 2002 (Year: 2002).*
When do more processor cores mean better PC performance? by Spiceworks (Year: 2017).*
Network Bandwidth and How is it Measured? by Froelich (Year: 2021).*
What Does Protocol Mean? by Rouse (Year: 2020).*
Multiple Core Processors: Is More Always Better? by Kyrnin (Year: 2020).*

* cited by examiner

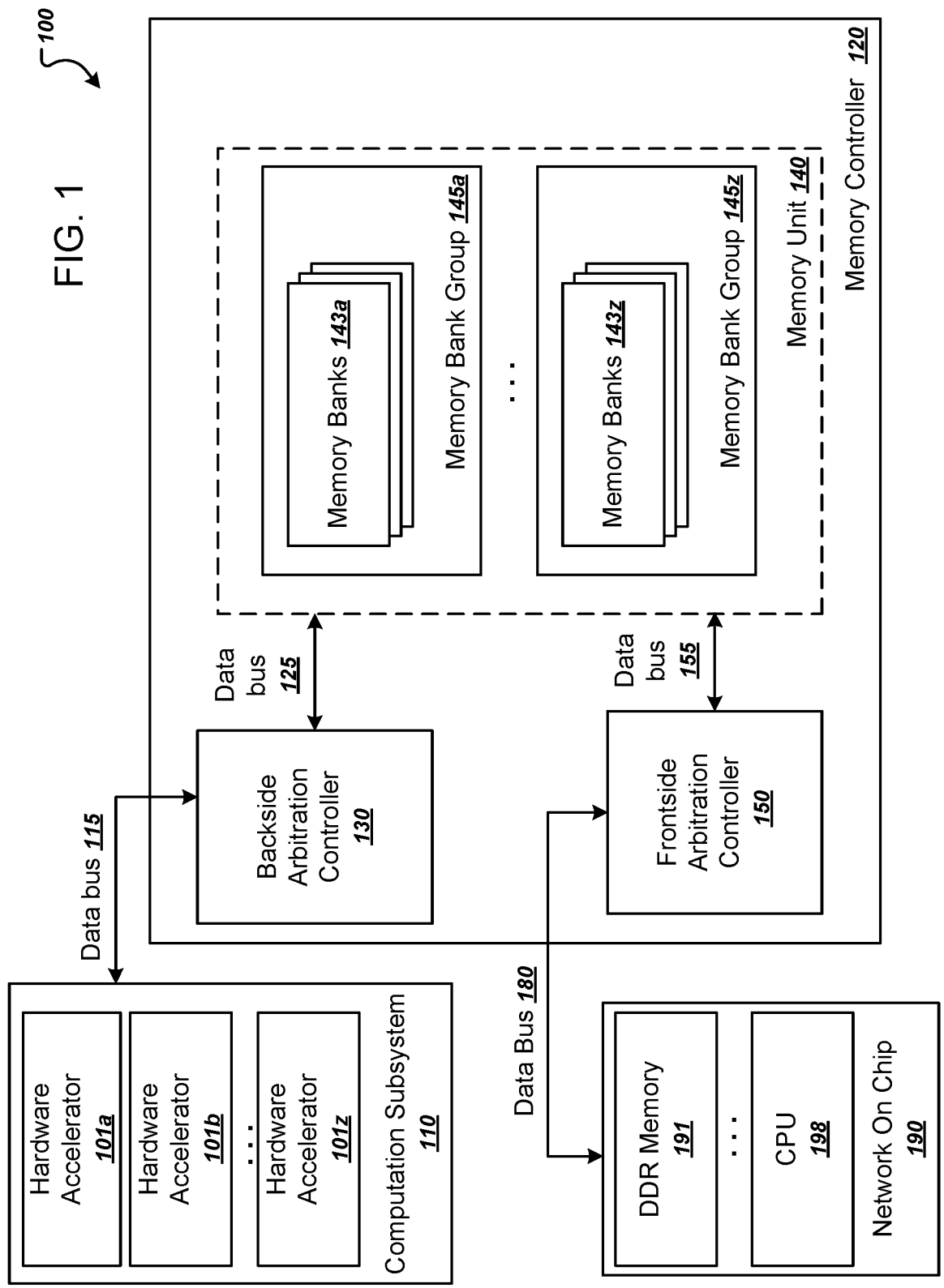

HIGH-PERFORMANCE ON-CHIP MEMORY CONTROLLER

BACKGROUND

This specification relates to a memory controller, and more particularly, to a high-performance on-chip memory controller for performing computations of machine learning models.

A memory controller is a computer circuit configured to manage data flow between a memory unit and one or more hardware components. For example, a memory controller can determine data flow direction (e.g., data load or data store) between a main memory in a computer or a chip and a plurality of hardware accelerators communicatively connected with the main memory unit through particular memory interfaces. A memory controller can be a separate component external to a chip or a computer, or can be integrated into a chip, for example, a memory controller can be placed on the same die or as an integral part of a processor unit on a chip. The on-chip memory controller can sometimes be called an integrated memory controller.

Artificial intelligence (AI) is intelligence demonstrated by machines and represents the ability of a computer program or a machine to think and learn. One or more computers can be used to perform AI computations to train machines for respective tasks. The AI computations can include computations represented by one or more machine learning models.

Neural networks belong to a sub-field of machine-learning models. Neural networks can employ one or more layers of nodes representing multiple computations. One or more computers can be configured to perform computations of the neural networks to generate an output, e.g., a classification, a prediction, or a segmentation for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of network parameters.

In general, a memory controller can be configured to determine data transfer between a memory unit and hardware components when one or more computers perform computations of machine learning models, e.g., nodal operations for each layer of a neural network.

SUMMARY

The techniques described in the following specification are related to a memory controller architecture optimized for performing AI computations. In addition, the described techniques further relate to methods including operations performed by the memory controller to control data transfer on the flight, non-transitory computer-readable storage media encoded with instructions that, when executed by one or more computers, cause the one or more computers to perform the operations, and a memory controller system comprising one or more computers and one or more storage devices storing instructions that are operable, when executed by the one or more computers, to cause the one or more computers to perform the operations.

According to one aspect, a high-performance on-chip memory controller is configured to control memory access to a shared memory. The shared memory is accessible for a plurality of hardware components that are configured to perform computations. The computations can include any suitable computations for training and obtaining inferences from machine learning models. The shared memory can be any suitable memory unit on the chip. The shared memory can include multiple memory bank groups, each of which has one or more memory banks.

The memory controller can include at least one backside arbitration controller and a frontside arbitration controller. The at least one backside arbitration controller and the frontside arbitration controller are configured to couple with the shared memory and respective hardware components. Each of the at least one backside arbitration controller is coupled with one or more hardware components of a first group of hardware components. The frontside arbitration controller is coupled with one or more hardware components of a second group of hardware components. The second group of hardware components is different from the first group of hardware components. The backside arbitration controller is configured to determine which components of the first group of hardware components can access the shared memory during each cycle. Similarly, the frontside arbitration controller is configured to determine which components of the second group of hardware components can access the shared memory during each cycle. Each of the at least one backside arbitration controller and the frontside arbitration controller are configured to determine respective memory banks of the shared memory for the determined hardware components to access based on different access protocols. The second memory access protocol can include a common bus protocol compatible with one or more external data buses determined based on the characteristics of the second group of hardware components.

In some implementations, the first group of hardware components can include one or more arrays of hardware accelerators. Each array of hardware accelerators can include one or more multiplier-accumulator (MAC) units. The second hardware component can include a central processing unit (CPU) or digital signal processing unit (DSP).

The backside arbitration controller and frontside arbitration controller are configured to associate a respective priority level with a respective hardware component coupled with the corresponding controller. The backside and frontside arbitration controllers are further configured to determine whether a criterion is satisfied to change a priority level for a hardware component. In response, the backside and frontside arbitration controllers can boost a priority level of the hardware component and reorder data transactions based on the boosted priority level. The criterion can include a threshold number of requests stored in a queue or a timeout for a request.

The memory controller is further configured to perform data compression and decompression when hardware components access the shared memory.

It is well known that large-scale machine learning models can generate more accurate predictions than smaller ones given particular inputs. However, the large-scale machine learning models (e.g., deep and giant neural networks) can sometimes require extremely high memory bandwidth for data transfer (e.g., transfer of data representing layer inputs and outputs, layer parameters, or gradients in the backward propagation during training process), in particular, for processing input streams with large sizes.

Edge devices (e.g., smart phones, tablet, laptops, and on-vehicle control systems) configured to perform computations of machine learning models can suffer from bottleneck of memory bandwidth requirements when processing machine learning model input streams in real time. For example, self-driving vehicles (SDV) (or autonomous driving vehicles) can have multiple sensors configured to collect data representing ambient information. The collected data are usually data streams of respective sizes (image frames, video streams, or sensor signals). To generate accurate predictions of, for example, trajectories and poses of an SDV, the SDV needs to timely perform operations specified in one or more machine learning models using one or more edge devices (e.g., on-vehicle chips or systems) to process the collected data streams, which often requires high memory bandwidth. These memory bandwidth requirements are even higher when using large machine learning models processing high-resolution input data streams, for example, input image frames taken by 2M-pixel to 8M-pixel camera sensors.

In general, it is estimated that an edge device may need to perform 200 Tera Operations per Second (TOPS) to sustain performing inference operations of a trained machine learning model (e.g., ResNet50) to process 16 input streams at a rate of 30 frames per second and with an image resolution of 1080p. The memory bandwidth requirement for processing such input streams is at least 180 Gigabyte per second. However, the memory bandwidth requirement is too strict to be supported by traditional off-chip Double Data Rate (DDR) technologies (e.g., low-power DDR5 with 6400 data transfer rate and eight 32-bit memory channels).

One of the conventional methods to solve the memory bandwidth bottleneck is to use a system on chip (SOC) design using 3D packaging technology and High Bandwidth Memory (HBM). However, this conventional method suffers from increased design and manufacture effort and overall product cost, and does not guarantee low-latency memory access. Moreover, SOC design involving HBM requires joint development among one or more fabless SOC design companies, chip foundries, and memory device suppliers, which is often not feasible for start-ups or small-size companies.

Another conventional method is to adopt simple large on-chip memories. However, such method relies on arbitration provided by external networks-on-chip (NOC) or particular bus fabric, and suffers from longer latency for memory access.

Another conventional method is to use one or more on-chip L3 caches or last-level caches. However, such method cannot support low-latency sequential memory accesses for edge devices configured to perform operations of machine learning models for processing input streams.

The technologies disclosed in this specification aim to solve the above-noted problems. More specifically, the described technologies are related to a high-performance on-chip memory controller architecture configured to provide low-latency and high-throughput memory access, soothing the high bandwidth requirement for edge devices to perform inference computations specified in machine learning models for processing large input streams. In some implementations, an edge device implementing the described techniques can reach a computation performance at 200-400 TOPS, depending on the operating frequencies (e.g., 1.2 GHz).

The term "memory controller" in this specification can include at least a memory controller for a hardware circuit (e.g., a chip). Optionally, the memory controller can further include a memory controller system. The memory controller system can optionally include one or more hardware components, such as memory units, one or more hardware accelerators, or other on-chip clients communicatively coupled with the memory controller through respective ports or interfaces, for example, clients in the networks-on-chip (NOC) such as Central Processing Units (CPUs), Digital Signal Processors (DSPs), other DDR memories, Image Signal processors (ISPs), Peripheral Component Interconnect Express (PCIE) units, Universal Serial Bus (USB) units, Ethernet, displays, and one or more devices or computer programs configured to encode or decode digital data streams or signals (CODEC units).

The term "hardware accelerator" in this specification can include any suitable accelerators configured to accelerate computation tasks assigned to the corresponding accelerators. More specifically, the hardware accelerators can include any appropriate devices or hardware components configured to perform computation tasks offloaded from a host or a CPU, or any suitable devices or hardware components designed for particular computation tasks (e.g., vector reduction, tensor multiplication, basic arithmetic operations, and logic operations). For example, the hardware components can include one or more tiles (e.g., multiply-accumulate operation (MAC) units), one or more processing elements including multiple MAC units, one or more clusters including multiple processing elements, Graphic Processing Units (GPUs), Tensor Processing Units (TPUs), Vision Processing Units (VPUs), and DSPs, For simplicity, in the following specification, the term "memory controller" is referred to as the memory controller itself, the term "memory controller system" is referred to as a system including at least a memory controller, and the term "hardware accelerator" is referred to as a tile or a MAC unit.

Particular embodiments of the subject matter described in this specification can be implemented to realize one or more of the following advantages.

The techniques described below can improve performance of a hardware circuit (e.g., a chip) for performing computations specified by machine learning models.

First, an edge device or an edge circuit performing the described techniques can reduce latency and improve throughput for data transfer between a memory unit and other hardware components communicatively coupled with the edge device or the edge circuit. More specifically, the edge device or circuit can include an on-chip memory controller configured to separate memory accesses with low-latency and high throughput from all of the memory accesses by splitting bus interfaces into a backside bus interface and a frontside bus interface. The on-chip memory controller is further configured to control the backside and frontside interfaces using a backside arbitration controller and a frontside arbitration controller, respectively. Each interface is configured to couple with different hardware components having different ports and memory access requirements. Memory access through the backside and frontside interfaces is controlled by respective arbitration controller using a respective memory access protocol. For example, the backside interface is configured to communicatively couple with computation subsystems, i.e., clusters or arrays of hardware accelerators, and the chip memory (e.g., a main memory or a memory unit of the chip). The backside arbitration controller is configured to control data transfer (e.g., data store or data load) along backside data buses with a low-latency memory access protocol. The low-latency memory access protocol can be simple memory load and store commands that support wide bit sizes, instead of complex bus handshake protocol sequence.

A system performing the described techniques can reduce hardware overhead for accessing data from a particular memory address of a memory unit on the circuit. The circuit memory or the main memory of the circuit can include multiple memory bank groups, each of the memory bank groups having multiple memory banks. The memory controller can access all of memory addresses associated with the multiple memory banks in the multiple memory bank groups. Furthermore, the memory controller can determine different memory addresses for respective hardware accelerators (e.g., computation tiles, MAC units) to store to or load data from the determined memory addresses. In this way, the memory controller can prevent multiple computation units from accessing the same memory bank, which can prevent data access conflicts, cause more cache hit than cache miss, reduce hardware accelerator overhead for loading and storing data, and eventually improve the data transfer efficiency and the computation efficiency.

A system performing the described techniques, which includes the above-noted memory controller, can further improve system efficiency by determining which requests are prioritized based on priority levels of all requests for data transfer, or determining which hardware accelerator associated with a request is prioritized to store or fetch data by accessing a particular memory bank. In some situations, the memory controller can modify a priority level of a request or a hardware accelerator associate with the request to perform data transfer by accessing a memory bank, and reorder data transactions based on the updated priority levels to reduce data transfer jitters and provide better quality of service (QoS).

In addition, the techniques described in this specification can reduce memory usage and decrease memory bandwidth requirement by data compression and decompression. More specifically, a system performing the described techniques can include the on-chip memory controller, which is configured to compress data during loading and storing process, and de-compress the data for performing corresponding computations when necessary.

Moreover, the techniques described in this specification can improve on-chip memory management. A system performing the described techniques can deploy a unified programming model for a memory controller to ease requirements for special memory management. The system can also include different protecting mechanism to protect memory banks, and replace malfunctioning memory banks with functioning ones during the run-time based on translation between logical addresses to physical addresses.

Furthermore, the techniques described in this specification can provide efficient data transformation with reduced data transfer. The data transformation can include data operations that require memory-to-memory data flow. For example, the data transformation can include transposing tensors, generating vectors from a tensor, constructing a tensor from vectors, and rearranging data storage in the memory. Please note that scalars are zero-order tensors, and vectors are first-order tensors. A system performing the described techniques can support data transformation in the vicinity of memory, reducing data transfer costs and improving the performance of data transformation.

A system performing the described technologies in this specification can reduce power consumption and improve performance when performing computations specified in machine learning models deployed on an edge device or circuit. As described above, multiple hardware accelerators are communicatively coupled with a memory unit through a backside interface controlled by a backside arbitration controller, thus the data transfer traffic between the multiple hardware accelerators are local to each other, which can reduce wiring cost, memory latency, and energy consumption.

The system can further improve robustness and compatibility of an edge device or circuit to interface with multiple respective on-chip clients. More specifically, the system can include multiple ports or interfaces on both the frontside and backside interfaces. Each of the multiple ports or interfaces are adapted to be compatible with different access patterns and QoS requirements specified by respective clients communicatively coupled with or connected to the NOC of the edge device or circuit.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates an example memory controller system including an example memory controller and multiple external hardware components.

Like reference numbers and designations in the various drawings indicate like elements.

DETAILED DESCRIPTION

Figure 2A:
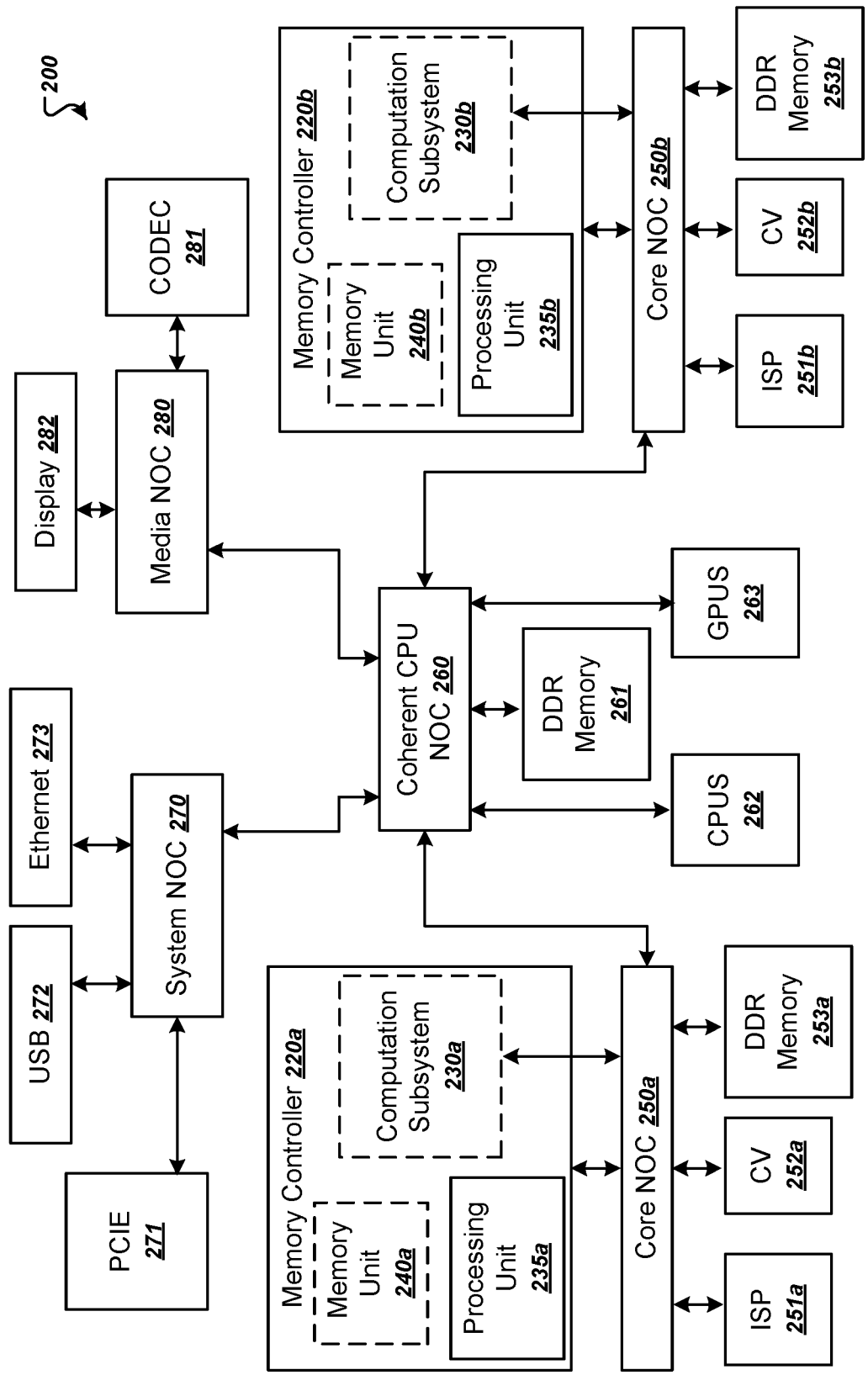
FIG. 2A illustrates an example system-on-chip including example memory controllers.

FIG. 1 illustrates an example memory controller system 100 including an example memory controller 120 and multiple external hardware components.

As shown in FIG. 1, the memory controller system 100 can include memory controller 120 configured to control data transfer between a memory and multiple hardware components. The memory controller 120 described in this specification is a high-performance on-chip controller that addresses low-latency and high throughput problems faced by conventional methods as described above.

For example, the system 100 can be located on an edge chip physically located on a self-driving vehicle (SDV). The edge chip on the SDV is configured to perform different computations to generate predictions for controlling the SDV to move along calculated trajectories without a human driver or human interference. The computations can include inference computations specified in one or more neural networks to output predictions. The memory controller 120 in the edge chip is configured to manage transferring data representing values for the inference computations between computation arrays (e.g., clusters of MAC units in a GPU) and the edge chip memory supporting high bandwidth requirement for the inference computations. The better the memory controller 120 manages the data transfer to have lower latency, less cache miss and more cache hit, and less memory data corruption, the faster and more accurate the output predictions generated by the edge chip for controlling the SDV.

Referring back to FIG. 1, the memory controller 120 is configured to be coupled with a memory unit 140 to load or store values into corresponding locations of the memory unit 140. The memory unit 140 can be a memory unit of the system 100, e.g., a chip memory.

Generally, a system's memory is configured to store values that are accessed and used to perform one or more operations or compute one or more values. Each value can be stored at a respective location in the system memory identified by a memory address. The memory can include multiple memory bank groups, each memory bank group having multiple one or more memory banks. Each memory bank can have multiple locations to store different values, and the multiple locations in each memory bank are associated with a corresponding set of memory addresses. For example and in connection with FIG. 1, the memory unit 140 can include multiple memory bank groups 145a-z, and each of the multiple memory bank groups can include multiple memory banks 143a-z.

The memory controller 120 of the system 100, is configured to control and manage accesses to specific memory locations of a given memory bank (e.g., 143a or 143z) to read or write data specified by a request. The memory controller 120 is further configured to manage data flow to and from the memory unit 140 and data flow from and to different hardware components of the system 100.

The different hardware components of the system 100, as shown in FIG. 1, can include a computation subsystem 110 having multiple hardware accelerators 101a-z configured to perform particular computation tasks, for example, vector reduction, tensor multiplication, basic arithmetic operations, and logic operations. As described above, the hardware components can include one or more tiles or processing elements each including one or more MAC units, GPUs, TPUs, VPUs, and DSPs. Each hardware component is communicatively connected or coupled with the memory controller 120 using data bus 115 for data transfer.

The different hardware components of the system 100 can further include suitable hardware components coupled with a Network On Chip (NOC) 190, such as one or more DDR memory units 191 and one or more CPUs 198. In general, the NOC 190 can be a standard network-based communications subsystem on an integrated circuit between modules in a system-on-chip (SOC). The modules can be IP cores schematizing various functions of a computer system. The NOC 190 can be a router-based packet switching network between SOC modules.

These hardware components are also referred to as on-chip clients throughout this specification. Each of the on-chip clients is physically connected with the memory controller 120 using different ports or interfaces, and are further communicatively coupled with the memory controller 120 using data bus 180 for data transfer. Note that the data access or memory access protocols between the hardware accelerators 101a-z in the computation subsystem 110 and the memory controller 120 can differ from those between the on-chip clients in the NOC 190 to the memory controller 120.

The memory controller 120 can apply different protocols for controlling data transfer between memory unit 140 and different hardware components because the memory controller 120 can include one or more arbitration controllers configured to control respective groups of hardware components using different memory access protocols.

As an example and in connection with FIG. 1, the memory controller 120 can include a backside arbitration controller 130 configured to control data transfer between the computation subsystem 110 and the memory unit 140, and include a frontside arbitration controller 150 configured to control data transfer between the on-chip clients connected to the NOC 190. The backside arbitration controller 130 can be configured to have a different memory access protocol from the front-end arbitration controller 150.

More generally and in connection with FIG. 1, the backside arbitration controller 130 is configured to be communicatively coupled with the memory unit 140 through data bus 125 and to be communicatively coupled with the first group of hardware components through data bus 115. The first group of hardware components can include computation arrays that are tightly-coupled computation arrays, e.g., computation subsystem 110 including multiple hardware accelerators, the system 100, the memory controller 120, or a host of the system can deploy a low latency memory access protocol through the backside arbitration controller 130 to manage data transfer between the computation arrays and the chip memory (e.g., memory unit 140). For example, the low latency memory access protocol can be a simple SRAM read and write interface extended with acknowledgement (ACK) requestors. For example, for multi-client memory access, each client (e.g., each hardware component) issues respected load or store requests to a memory controller to be processed during one or more cycles. The client needs to wait for respective acknowledgment messages from the memory controller and determine whether the memory controller has fully processed the requests issued by the client. The above-noted simple memory read and write operations can reduce the data access overhead (e.g., waiting time) for each client coupled in the system.

The frontside arbitration controller 150, on the other hand, is configured to be communicatively coupled with the memory unit 140 through data bus 145 and to be communicatively coupled with the second group of hardware components through data bus 180. The second group of hardware components can include general external clients, e.g., on-chip clients such as DDR memory units, CPUs, and additional GPUs coupled with the NOC 190. The host or the system 100 can deploy a common bus protocol, e.g., an advanced extensible interface (AXI) from a bus fabric suitable for one of the external clients or an AXI for the NOC 190. In general, an AXI can define QoS interface signals. An AXI transaction can also specify a burst transaction with a respective burst length, a burst type, and a transaction ID for data access arbitration decisions, to name just a few examples. The backside arbitration controller 130 and the frontside arbitration controller 150 will be described in greater detail below.

Even though there is only one backside arbitration controller 130 and one frontside arbitration controller 150 included in the example memory controller 120 shown in FIG. 1, it should be appreciated that the number of memory controllers 120 in a memory controller system 100, the number of backside arbitration controllers 130, and the number of frontside arbitration controllers 150 can be more than one, for example, two, five, or more.

FIG. 2A illustrates an example system-on-chip 200 including example memory controllers 220a and 220b.

As described above, the memory controller 120 of FIG. 1 can address the low-latency and high-throughput memory bandwidth requirements for performing inference computations specified by one or more machine learning models deployed on an edge chip. The edge chip including the memory controller 120 of FIG. 1 can deliver hundreds of TOPs to sustain the inference computations, for example, for generating predictions for controlling an SDV.

As shown in FIG. 2A, the system on chip 200 can include two memory controllers 220a and 220b. Each of the memory controllers 220a, 220b can further include a processing unit 235a, 235b configured to process data before storing or sending out, e.g., compressing or decompressing the data.

Each memory controller, 220a, 220b is configured to be communicatively coupled with the memory unit 240a and 240b of the edge chip, respectively. The memory units 240a, 240b can be the same chip memory or separate memory units each taking up a respective portion of the chip memory. Note that the memory unit 240a, 240b is surrounded by a dashed line to indicate the memory unit 240a, 240b is not necessarily included in the memory controller 220a, 220b, respectively, but instead could be communicatively coupled with the corresponding memory controller. In some implementations, the memory unit 240a, 240b can be any suitable memory on the chip accessible and controlled by the memory controllers 240a, 240b.

Each memory controller, 220a, 220b is further configured to be communicatively coupled with computation subsystem 230a and 230b, respectively. Each computation subsystem 230a, 230b can include one or more clusters of computation arrays, each cluster including one or more computing units such as MAC units. Each memory controller, 220a, 220b is assigned to control data transfer between a group of clusters and a memory unit (e.g., chip memory). Note that computation subsystems 230a, 230b are surrounded in dashed lines, which intends to indicate that computation subsystems 230a and 230b are not necessarily included in the memory controllers 220a and 220b, respectively. In some implementations, one or more of the computations subsystems can be located off the corresponding memory controller while being communicatively coupled with the memory controller e.g., through a data bus.

These computation subsystems 230a, 230b, as described above, can include multiple computation clusters. For example, each computation subsystems 230a, 230b can include at least one high-end digital signal processor (DSP) and multiple hardware accelerator arrays. Each of the hardware accelerator arrays can include 8K to 16K MAC units. The SOC 200, as shown in FIG. 2A, can provide at least a total performance of 200-400 TOPS at a particular operating frequency (e.g., a nominal frequency of 1.2 GHz).

Each memory controller 220a, 220b is communicatively coupled with a Core NOC 250a, 250b. Each core NOC 250a, 250b is communicatively coupled with at least one Image Signal Processors (ISP) 251a, 251b, at least one control voltage (CV) 252a, 252b, and at least one DDR memory unit 253a, 253b, respectively.

The core NOCs 250a and 250b are communicatively coupled with a coherent CPU NOC 260. The coherent CPU NOC 260 can include a high-speed processor expansion bus standard, which is configured for directly connecting CPUs to external accelerators like GPUs, ASICs, FPGAs, or fast storage. The coherent CPU NOC 250 can have low latency, high speed, and direct memory access (DMA) connectivity between devices (e.g., external clients) having different bus standards or architectures based on respective instructions.

The coherent CPU NOC 260 is communicatively coupled with multiple clients, such as one or more additional CPUs 252, one or more additional GPUs 263, one or more DDR memory units 261, a system NOC 270, and a media NOC 280. The one or more additional CPUs can include a CPU cluster which includes 8 to 16 high-end ARM CPUs The system NOC 270 is communicatively coupled with a USB interface 272, an Ethernet interface 273, and Peripheral Component Interconnect Express (PCI-E) interface 271 with a shared parallel bus architecture.

The media NOC 280 is communicatively coupled with a display interface 282 configured to couple with a display and a CODEC interface configured to couple with one or more encoders and decoders for a signal or data stream.

It should be appreciated that the term "communicatively coupled" as described above and throughout this specification represents any suitable connectivity between components or clients in the SOC 200 of FIG. 2A. It should also be appreciated that the term "connect" and "couple" throughout this specification broadly represent any type of direct or indirect connectivity between respective components. The connectivity can include a data bus with suitable memory access protocols or bus standards, any wired or wireless inter-component connectively, and any local or cloud communication between suitably coupled components.

Figure 2B:
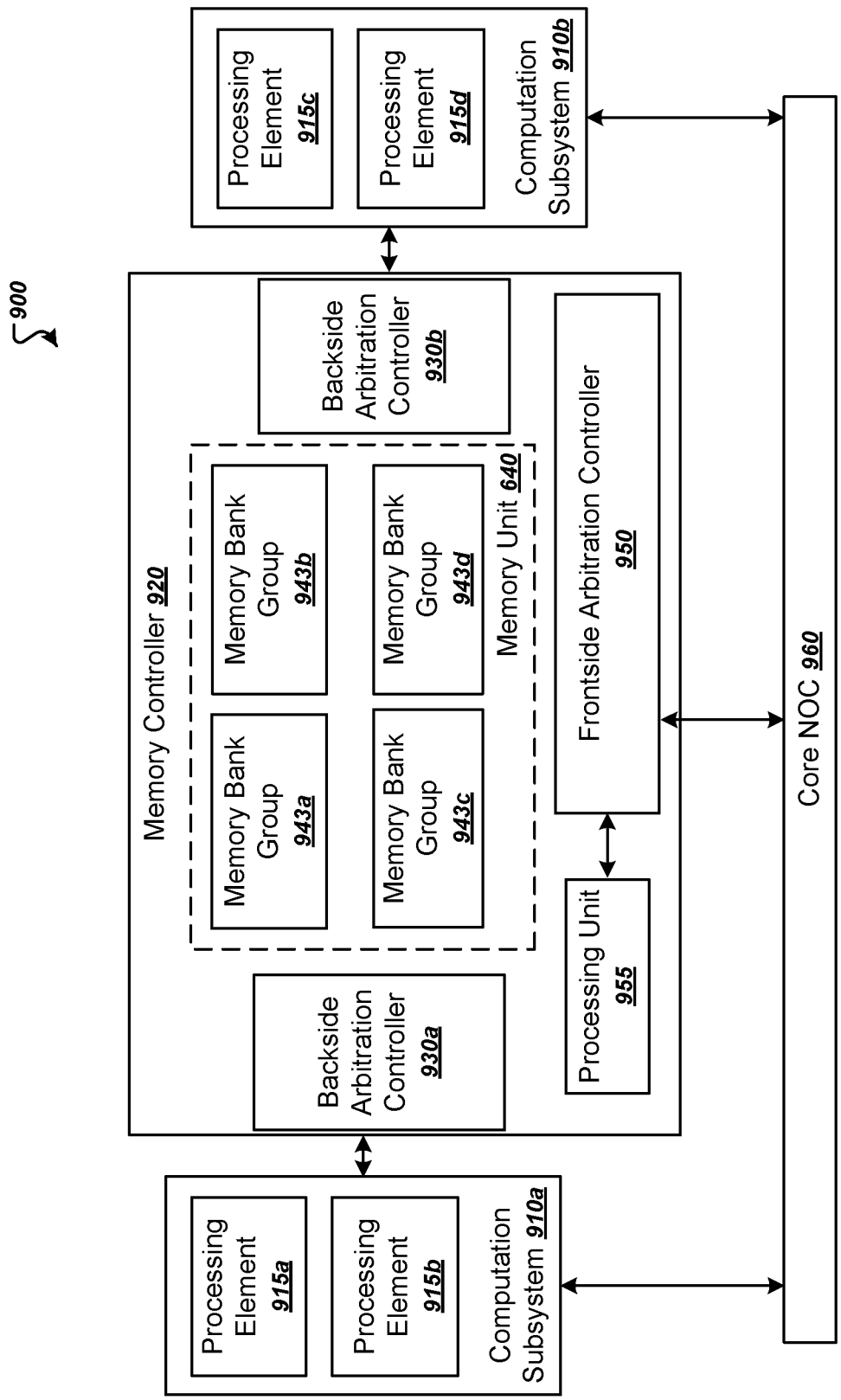
FIG. 2B illustrates a zoom-in example architecture of the chip including the example memory controller of FIG. 2A.

FIG. 2B illustrates a zoom-in example architecture 900 of the chip including the example memory controller 920 of FIG. 2A.

As shown in FIG. 2B, the memory controller 920 can include two backside arbitration controllers 930a and 930b, and a frontside arbitration controller 950. Each of the two backside arbitration controllers 930a and 930b are communicatively coupled with a respective computation subsystem 910a and 910b. The frontside arbitration controller 950 is communicatively coupled with a core NOC 960, which is further coupled with one or more ISP units, CV units, DDR memory units, and other clients or NOCs coupled with additional clients (not shown in FIG. 2B), similar to those described in FIG. 2A.

The backside arbitration controllers 930a, 930b each can determine data transfer or data transactions between a respective computation subsystem assigned to the backside arbitration controller and memory unit (e.g., memory unit 140 in FIG. 1) of the edge chip. The computation subsystems 910a, 910b can include multiple hardware accelerators, such as processing elements 915a-d, each including multiple MAC units. The backside arbitration controller 930a, 930b can determine which processing element 915a-d "wins" to access data from the memory unit 140. The term "winning" described throughout the specification broadly represents selecting a processing element among multiple processing elements to access a memory unit first, when the controller receives respective requests of accessing the memory unit from the multiple processing elements in parallel. The backside arbitration controller 930a, 930 perform data transaction operations between the winning processing element and the memory unit 140 following a low-latency memory access protocol, as described above.

The backside arbitration controller 930a, 930b can determine winning components in the computation subsystem 910a, 910b based at least on a priority level for each component. The details of performing arbitration based on priority level will be described in connection with FIG. 5.

As shown in FIG. 2B, the memory unit 940 includes multiple memory bank groups 943a-d, each of the memory bank groups including one or more memory banks having multiple memory locations associated with respective memory addresses, which provides hardware foundation for parallel memory access at different locations by different hardware accelerators during a single cycle. The detailed architecture of the memory unit 940 will be described in connection with FIG. 3.

The backside arbitration controller 940a, 930b can interleave memory addresses for different locations in one or more memory banks of a memory bank group or different locations across multiple memory bank groups. By interleaving multiple memory addresses to perform data operations (e.g., data store or data load), the backside arbitration controller 930a and 930b can convert a single large sequential memory access request into scattered memory accesses across multiple locations of multiple memory banks in parallel. In this way, back-to-back memory accesses to the same memory location of a memory bank can be reduced or eliminated. It is also less likely for two different hardware accelerators to access the same location during the same cycle, which reduces conflicts in data access and therefore reduces overhead and improves the data access efficiency. Furthermore, memory accesses to different locations are evenly distributed, which solves "hot spot" issues that can cause imbalanced usage of memory. This can improve thermal properties and power usage of the edge chip and reduce local memory location failure due to overuse, extending the lifespan of the memory unit. The details of interleaving schemes for memory access will be described in connection with FIG. 6.

Figure 4:
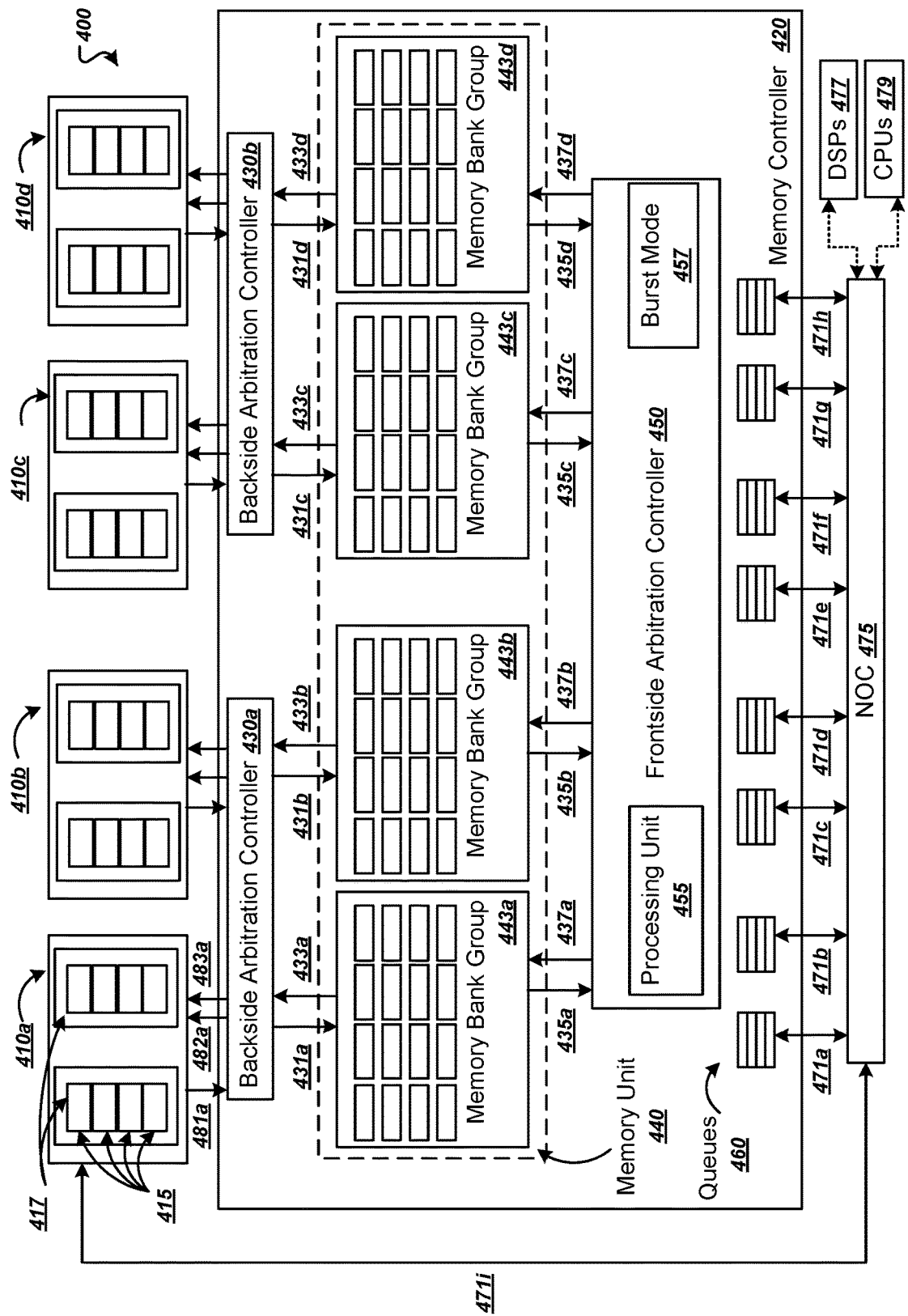
FIG. 4 illustrates an example top connectivity of the example memory controller of FIG. 2A at both backside and frontside.

The memory controller 920, as shown in FIG. 2B, can further include a processing unit 955 communicatively coupled with the frontside arbitration controller 950. In some implementations, the processing unit 955 can be included in the frontside arbitration controller 950 (e.g., as shown in FIG. 4). The processing unit 955 is configured to compress and decompress data during data transfer between the core NOC 960 and the memory unit 940. The processing unit 955 can compress data such as values for calculating outputs for one or more machine learning models before storing the data in the memory unit. The processing unit 955 can also decompress the compressed data after fetching the compressed data stored in the memory unit 940. For example, the processing unit 955 can decompress a value by quantization, e.g., convert a value in floating-point format into an integer format or a scientific notation with reduced precision. The processing unit 955 can convert the compressed value in the integer format or the scientific notation back to the floating-point format before providing it to other hardware components for performing operations or computations.

For data representing layer weights for a layer of a neural network and stored in a tensor format (e.g., two-dimensional matrices), the processing unit 955 can reduce the memory size required for storing the layer weights by compressing the layer weights. For example, the processing unit can remove zero terms from the tensor that stores the layer weights, denote values and locations for the non-zero terms with respect to the tensor, and store the denoted non-zero terms with their respective locations in the memory unit 940.

When the stored layer weights are requested for generating a layer output, the processing unit 955 can reconstruct the tensor format based on the stored non-zero terms and their respective locations before providing the layer weights to hardware components.

Figure 3:
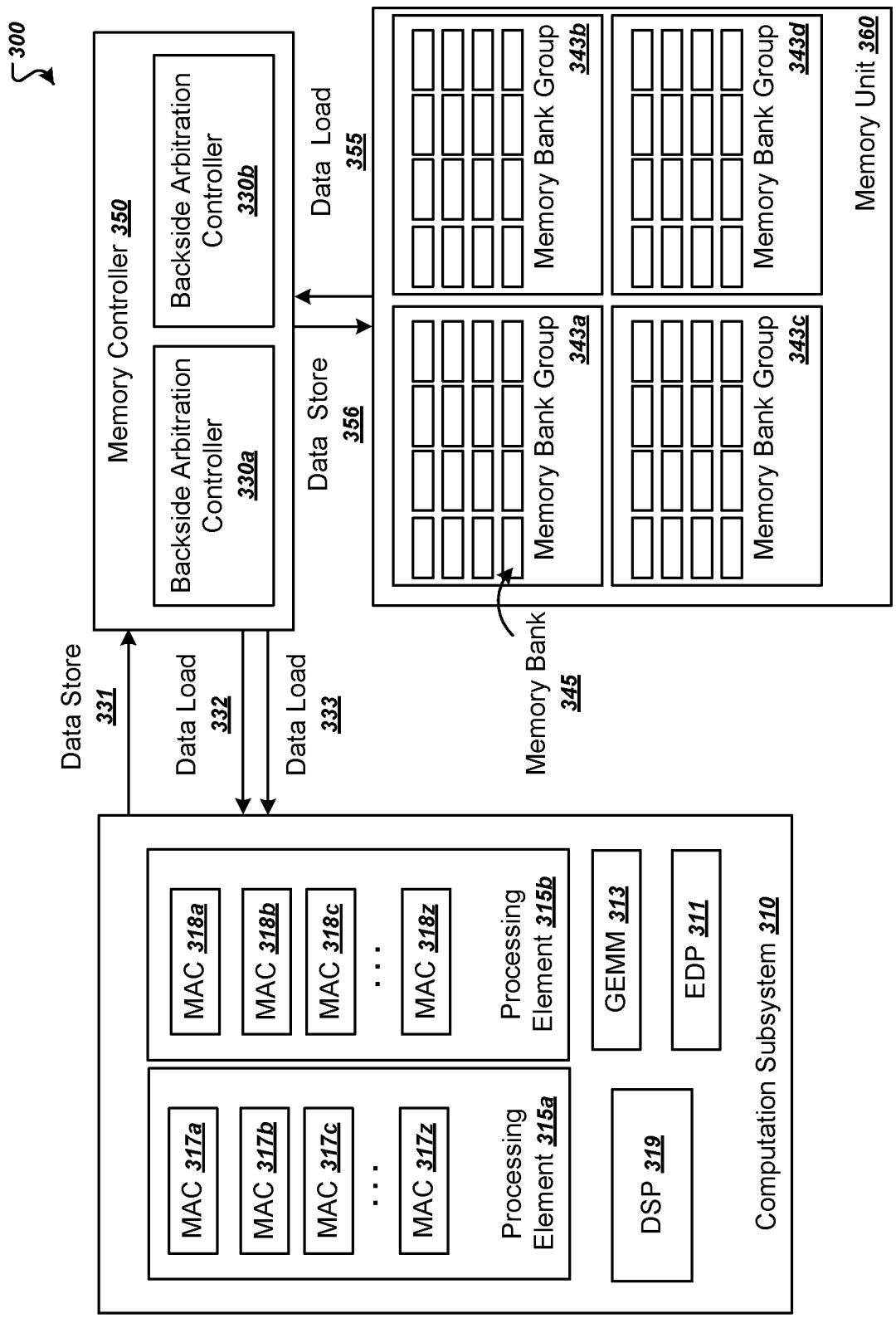
FIG. 3 illustrates an example connectivity of the example memory controller of FIG. 2A with memory unit and computation subsystem at the backside.

FIG. 3 illustrates an example connectivity 300 of the example memory controller 350 of FIG. 2A with memory unit 360 and computation subsystem 310 at the backside.

As shown in FIG. 3, the memory controller 350, equivalent to the memory controller 120 of FIG. 1, memory controllers 220a, 220b of FIG. 2A, and memory controller 920 of FIG. 2B, is communicatively coupled with a computation subsystem 310 and a memory unit 360. More specifically, the backside of the memory controller 350 is coupled with the computation subsystem 310 and the memory unit 360 using one or more data buses configured for data operations, e.g., data load and data store. For example and in connection with FIG. 3, the data buses can include one bus 331 configured for data store and two buses 332 and 332 configured for data load. As another example, the memory controller 350 can have a data bus 355 configured to load data from the memory unit 360 and another bus 356 for storing data to the memory unit 360.

It should be appreciated that even though there are three data buses configured for data transfer between the computation subsystem 310 and the memory controller 350, and two data buses configured for data transfer between the memory unit 360 and the memory controller 350 for the ease of illustration, the total number of data buses for data transfer between the memory controller 350 and the group of hardware components coupled with the backside of the memory controller 350 can be three, five, ten, and more.

The computation subsystem 310 can include one or more processing elements 315a, 316b. The processing elements 315a, 315b can include one or more MAC units 317a-z and 318a-z, respectively.

The computation subsystem 310 can further include a digital signal processor (DSP) unit 319, and a general matrix-to-matrix multiplication unit (GEMM) 313, and an electronic data processing unit (EDP) 311.

Each component included in the computation subsystem 310 can be configured to receive input data from the memory controller 350 along the data load buses 332 and 333 to compute output data, and store the output data to the memory unit 360 through the data store bus 331. For example, one or more of the MAC units 317a-z or 318a-z can request to load data from or store data to the memory unit 360 through respective data buses. The memory controller 350 can determine which MAC unit of all the MAC units can be granted access to the memory unit 360 and perform data operations of loading or storing data to the memory unit 360.

The memory controller 360 can include multiple backside arbitration controllers, each of the backside arbitration controllers can manage data access for a respective cluster of hardware accelerators, e.g., arbitrating a MAC unit for data transfer as described above. For example, as shown in FIG. 3, the memory controller 360 can include a first backside arbitration controller 330a and a second backside arbitration controller 330b. The first backside arbitration controller 330a is configured to manage and arbitrate data transfer among all MAC units 317a-z of the first processing element 315a, and all MAC units 318a-z of the second processing element 315b. The determination of which MAC unit is to be granted access to the memory unit 360 at a time cycle can be based on a priority level of each MAC unit. The details of the priority level will be described in connection with FIG. 5.

The memory controller 350 can interleave memory access among multiple memory locations of memory banks in the memory unit 360 when one or more winning MAC units are granted access to the memory unit 360. As described above, the memory controller 350 can generate instructions directing to different memory locations distributed among different memory banks or bank groups, so that the one or more winning MAC units can substantially in parallel access different portions of data corresponding to respective requests. For example, the memory controller 350 can issue instructions to retrieve a first portion of data corresponding to a first request by the first winning MAC unit 317a at a first memory address of a memory bank 345 in the memory bank group 343a, and to retrieve a second portion of the data at a different memory address of a second memory bank in the same memory bank group 343a. The memory controller 350 can further issue instructions to retrieve the rest of the data corresponding to the first request at a memory address of a memory bank in a different memory bank group 343d. In this way, the memory controller 350 can allow parallel data access among different MAC units without conflict and ensure even usage of different memory banks and bank groups, which improves the memory bandwidth and the computation efficiency of the edge chip.

FIG. 4 illustrates an example top connectivity 400 of the example memory controller 420 of FIG. 2A at both backside and frontside.

As shown in FIG. 4, the memory controller 420 includes two backside arbitration controllers 430a, 430b communicatively coupled with the memory unit 440 and a first group of hardware components 410a-d. The first group of hardware components can include one or more arrays of hardware accelerators, each array of hardware accelerators having one or more multiplier-accumulator (MAC) units, as described above. For example, the first group of hardware components can include four accelerator engines 410a-d (e.g., computation subsystems 310 of FIG. 3), each of the four accelerator engines can include multiple arrays 415 (e.g., processing elements 315a, 315b of FIG. 3). Each of the multiple arrays can include multiple hardware accelerators 417 (e.g., MAC units 317a-z, 318a-z of FIG. 3).

The memory unit 440 can include multiple memory bank groups 443a-443d. Each of the memory bank groups can include multiple memory banks. For example, as shown in FIG. 4, memory unit 440 can include four memory bank groups, and each memory bank group can include 16 logical memory banks. Each logical bank can have a width of 64B and a total size of 0.5 MB (equivalent to 512-bit times 8K) to be compatible with a computation cluster (e.g., processing element 315a, 315b of FIG. 3) having 8K MAC units. The total shared memory of the memory unit 440 can be up to 32 MB.

The backside arbitration controllers 430a, 430b, are assigned to a different subgroup of the first group of hardware components 410a-d. Each of the backside arbitration controllers 430a, 430b are configured to manage data flow from and to the assigned subgroup of hardware components. For example and in connection with FIG. 4, the backside arbitration controller 430a is assigned to a first subgroup of hardware components that include a first hardware component 410a and a second hardware component 410b, and the backside arbitration controller 430b is assigned to a second subgroup of hardware components that include a third hardware component 410c and a fourth hardware component 410d.

The backside arbitration controllers 430a and 430b can manage data transfer from and to the assigned subgroup of the first group of hardware components 410a-d through data buses. For example, the backside arbitration controller 430a can manage data transfer from and to the first hardware component 410a through one data bus 481a configured for data store and two data buses 482a and 483a for data load. Each of the data buses can have a respective width. For example, the two data buses 482a and 483a for data load can each have a load or read interface of 512 bits, and the data bus 481a for data store can have a store or write interface of 512 bits. In some implementations, the two data buses 482a and 483a for data load can each have a load or read interface of 1024 bits, and the data bus 481 for data store can have a store or write interface of 1024 bits. Note that the rest of the data buses between the first group of hardware components 410a-d and the backside arbitration controllers 430a, 430b are not numbered in FIG. 4.

In some implementations, data buses connecting the first group of hardware components do not support burst mode.

The backside arbitration controllers 430a and 430b can further manage data transfer from and to the memory unit 440 through data buses 431a-d and 433a-d. As shown in FIG. 4, each of the data buses 431a-d is configured for storing data to the memory unit 440, and each of the data buses 433a-d is configured for loading data from the memory unit 440. Each of the data buses 431a-d and 433a-d can have a respective bandwidth or a common bandwidth. For example, all of the data buses 431a-d and 433a-d can have an interface of at least 512 bits, e.g., in some implementations, one or more data buses 431a-d and 433a-d can have an interface of 1024 bits.

The backside arbitration controller 430a, 430b can define a first memory access protocol for the hardware components in the first group. For example, the first memory access protocol can be a low latency memory access protocol, as described above.

The backside arbitration controllers 430a and 430b can perform bus arbitration to determine which hardware components or subcomponents of a hardware component can access the memory unit 440 through the above-noted data buses. The arbitration to grant memory access for a hardware component or subcomponent can be performed based on respective priority levels associated with the hardware components or subcomponents. The details of the priority level will be described below.

In response to determining a hardware component or a subcomponent can access the memory unit 440, the backside arbitration controller 430a or 430b can determine one or more memory addresses in one or more memory banks or memory bank groups for the determined hardware component or subcomponent to access. The backside arbitration controllers 430a and 430b can issue instructions for the determined hardware component or subcomponent to access multiple memory addresses in parallel by memory address interleaving schemes. The details of interleaving schemes will be described in connection with FIG. 6.

After determining which hardware component or subcomponent can access the memory unit 440, the backside arbitration controller 430a or 430b can issue at least one of the instructions simultaneously for the hardware component to access the memory unit 440, e.g., (a) two 1024-bit width data load instructions, (b) one 1024-bit load instruction and one 1024-bit store instruction, or (c) one 1024-bit width data load or data store instruction, given the data buses are of 1024-bit width.

The memory controller 420 can further include a frontside arbitration controller 450. The frontside arbitration controller 450 is communicatively coupled with the memory unit 440 and a second group of hardware components in a NOC 475 to manage data flow between the memory unit 440 and the NOC 475 and components coupling to the NOC 475. For example, the second group of hardware components can include the NOC 475 and hardware components coupled with the NOC 475, e.g., one or more central processing units (CPUs) 479 or digital signal processing units (DSPs) 477, as described above.

The front side arbitration controller 450 can manage data flow from and to the memory unit 440 through data buses 435a-d and 437a-d. Each of the data buses can be configured for data store or data load with a respective width. For example, the data buses 435a-d can be configured for data load at a width of 512 bits, and the data buses 437a-d can be configured for data store at a width of 512 bits. In some implementations, the data buses 435a-d and 437a-d can have a width of 1024 bits for data load to store operations.

The frontside arbitration controller 450 can further manage data flow from and to the second group of hardware components (e.g., NOC 475) through data buses 471a-h. The data buses 471a-h can be configured for both data store and data load.

The frontside arbitration controller 450 can define a second memory access protocol for the hardware components in the second group. For example, the second memory access protocol can include a common bus protocol compatible with one or more external data buses. The one or more external data buses are determined based on the properties or characteristics of respective hardware components in the second group of hardware components. As another example, the data buses 471a-d under the second memory access protocol can be AXI agents (e.g., 8 AXI agents from the frontside arbitration controller 450), each of the AXI buses having a separate data load and data store channel of 128 bit. In some implementations, hardware components 410a-d of the first group of hardware components can each have one or more AXI agents 471i directly coupled with the NOC 475 for data communication.

The arbitration controller 450 can further include a burst mode unit 457 for supporting the burst mode of data transfer. In some implementations, the data buses 471a-d coupled with the second group of hardware components can support burst mode for one or more hardware components of the second group of hardware components to access the shared memory. The burst mode for data transfer is controlled by the burst mode unit 457 of the frontside arbitration controller 450. The burst mode requires data access to the same memory bank.

Even though the burst mode can be pre-determined and pointed to a contiguous range of memory addresses in the same physical memory bank, the memory controller described in this specification can map the contiguous memory addresses to different (e.g., non-contiguous) addresses and split the original burst mode addresses to different memory banks or memory bank groups based on one or more interleaving schemes. The interleaving schemes will be described in greater detail below.

The frontside arbitration controller 450 can perform bus arbitration to determine which hardware components or subcomponents of the second group of hardware components can access the memory unit 440. The determination can be based on a priority level associated with the hardware components or subcomponents. The determination will be described in greater detail in connection with FIG. 5.

As shown in FIG. 4, the memory controller 420 can further include multiple queues 460. The frontside arbitration controller 450 can load data from the memory unit 440, store the loaded data into one of the queues 460, and provide the data from the queue to the second group of hardware components (e.g., NOC 475) through one of the AXI buses 471a-h. For example, one or more queues 460 can be a first-in-first-out (FIFO) queue. As another example, one or more queues 460 can be a last-in-first-out (LIFO) queue.

The frontside arbitration controller 450 can perform arbitration based on properties of the queues 460 or threshold values associated with the queues 460. The properties of the queues 460 can be used to adjust priority levels of one or more hardware components or subcomponents of the second group. The frontside arbitration controller 450 can reorder data transfer based on the updated priority level. The details of recording data transfer will be described in connection with FIG. 5.

Furthermore, as described above, the frontside arbitration controller 450 can further include a processing unit 455 for compressing and decompressing data during data transfer. The purpose of the data compression can be to reduce memory bandwidth requirements for data transfer between the second group of hardware components (e.g., external DDR memory units) and shared memory unit (e.g., on-chip SRAMs). The system can compress data when transferring the data from the shared memory unit to the second group of hardware components through the frontside interface, and decompress data when transferring data from the second group of hardware components to the shared memory unit and stored the decompressed data in the shared memory unit.

More specifically and in connection with FIG. 4, the processing unit 455 is configured to perform data compression when one or more hardware components or subcomponents of the second group coupled with the NOC 475 request data to be loaded from the memory unit 440, and perform data decompression when the one or more hardware component or subcomponents request to store data in the memory unit 440. In some implementations, the data compression and decompression performed by the processing unit 455 can have a granularity level of 128B to facilitate random memory access.

The frontside arbitration controller 450 and the backside arbitration controller 430a, 430b can perform bus arbitrations to allow respective hardware components of the first and second groups of hardware components to access the memory unit 440 at a particular size during each memory access cycle. For example and as described in the examples above, the frontside arbitration controller 450 and the backside arbitration controller 430a, 430b can ensure at least one 512-bit memory access during each cycle to the same memory bank group. Therefore, the memory controller 420 can provide 512-bit data transactions from and to each of the four different memory bank groups 443a-d in parallel during each cycle. In some implementations, when the data buses for the first and second groups of hardware components have a width of 1024 bits, the memory controller 420 can provide 1024-bit data transactions from and to each of the four different memory bank groups 443a-d in parallel during each cycle.

It should be appreciated that the number of memory banks and memory bank groups in the memory unit 440, the memory bandwidths and sizes associated with memory banks and memory bank groups, the number of hardware components of the first and second groups of hardware components, the number, types, and the bandwidths for data buses, the number and sizes of queues, and the number of backside arbitration controllers 430a, 430b and the frontside arbitration controllers 450 can be determined and varied according to different computation requirements.

Figure 5:
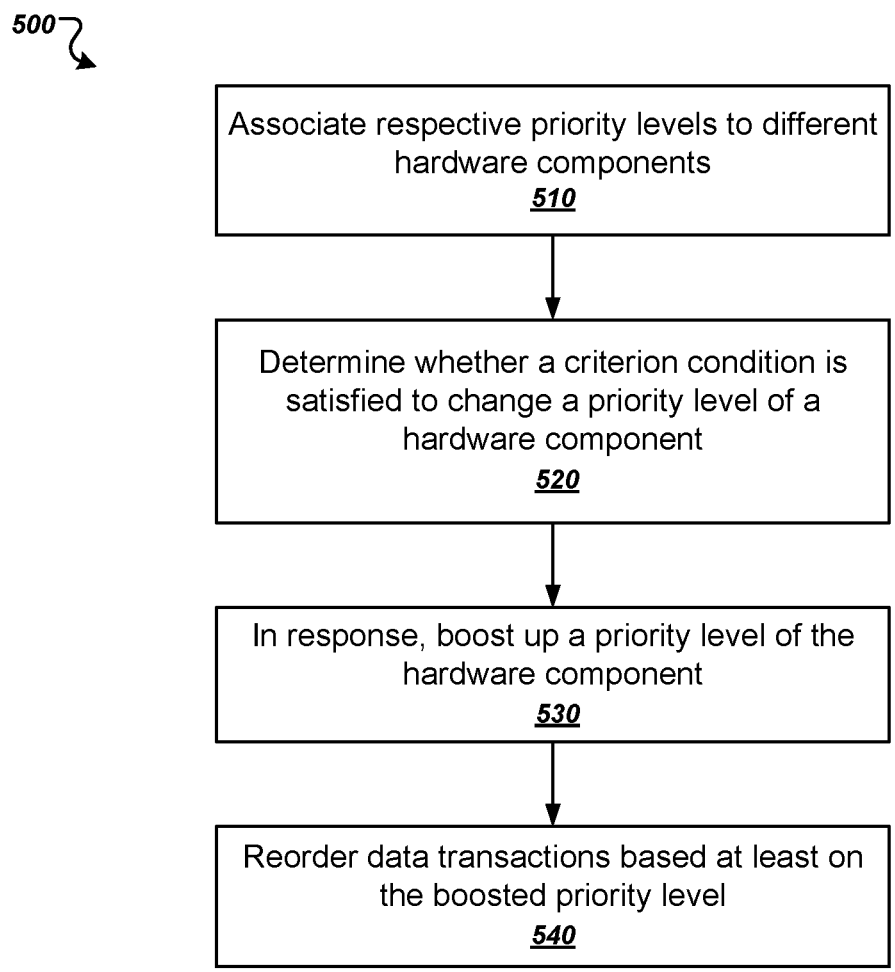
FIG. 5 is a flow diagram of an example process of reordering data transactions based on priority levels.

FIG. 5 is a flow diagram of an example process 500 of reordering data transactions based on priority levels. For convenience, the process 500 will be described as being performed by a system of one or more computers located in one or more locations. For example, a system including a memory controller for managing data flow to and from a memory unit, e.g., the memory controller system 100 of FIG. 1, appropriately programmed, can perform the process 500.

The system can associate respective priority levels to the first and second groups of hardware components (510). In general, the respective priority levels associated with the first group of hardware components are higher than those associated with the second group of hardware components. For example, the priority level can range from level 0 to level 3, with level 0 being the lowest priority level and level 3 being the highest priority level.

In some implementations, the system can associate hardware components of the first group of hardware components with a priority level 1 or priority level 2. The system can initially associate a priority level 0 or priority level 1 with hardware components in the second group of hardware components.

In some implementations, the system can associate respective priority levels to requests issued by different hardware components. For example, the system can associate a first request issued by a hardware component with a priority level 2, and a second request issued by the hardware component with a priority level 0.

The system can determine whether a criterion is satisfied to change a priority level for a hardware component of the second group of hardware components or a request issued by a hardware component (520). The criterion can include a threshold queue value or a threshold time value. For example, the threshold queue value can represent a threshold number of pending requests issued by a hardware component stored in a queue or a total length of pending requests stored in the queue. As another example, the threshold time value can represent a time that a pending request issued by a hardware component has been stored in a queue. The system or a user can predetermine these threshold values.

The system can determine that a criterion is satisfied by determining that a number of pending requests stored in a queue (or a total length of the queue) has reached the threshold queue value, or a time period, counted by a timer, of a pending request being stored in a queue has reached the threshold time value. When the time period exceeds the threshold time value, the system can determine that a "time-out" has occurred for the request issued by the hardware component to access the shared memory.

In response to determining that the criterion has not been satisfied yet, the system can maintain the current priority level for the hardware component or one or more requests issued by the hardware component for accessing the shared memory. The controllers in the system can determine whether the hardware component or the requests issued by the hardware component are granted based on the priority levels.

In response to determining that the criterion is satisfied, the system can boost a priority level of the hardware component or one or more requests issued by the hardware component for accessing the shared memory so that data transactions associated with the hardware component are prioritized (530). For example, the system can modify a priority level of the oldest request in the queue issued by the hardware components. For example, the system can boost the priority level of the oldest pending request issued by the hardware component, from an initially-set priority level 0 or 1 to a priority level 3. As another example, the system can modify a priority level of a hardware component from a priority level 1 to a priority level 2.

The system can then reorder data transactions between the plurality of hardware components and the shared memory based on current priority levels associated with the plurality of hardware components (540). The system can arbitrate hardware components with higher priority levels to access the memory unit before those with lower priority levels. For example, the system can determine that hardware components of the first group of hardware components with a priority level 2 can access the memory unit earlier than those with a priority level 1. As another example, the system can determine that requests issued by hardware components of the first group hardware components with a priority level 1 are processed earlier than hardware components of the second group with an initially-set priority level 0.

After boosting the priority levels for hardware components of the second group in response to determining a criterion is satisfied, the system can reorder the data transactions based on the current or updated priority levels. For example, the system can determine hardware components of the second group with an updated priority level 3 to access the memory unit earlier than those of the first group of hardware components with a priority level 2.

Figure 6:
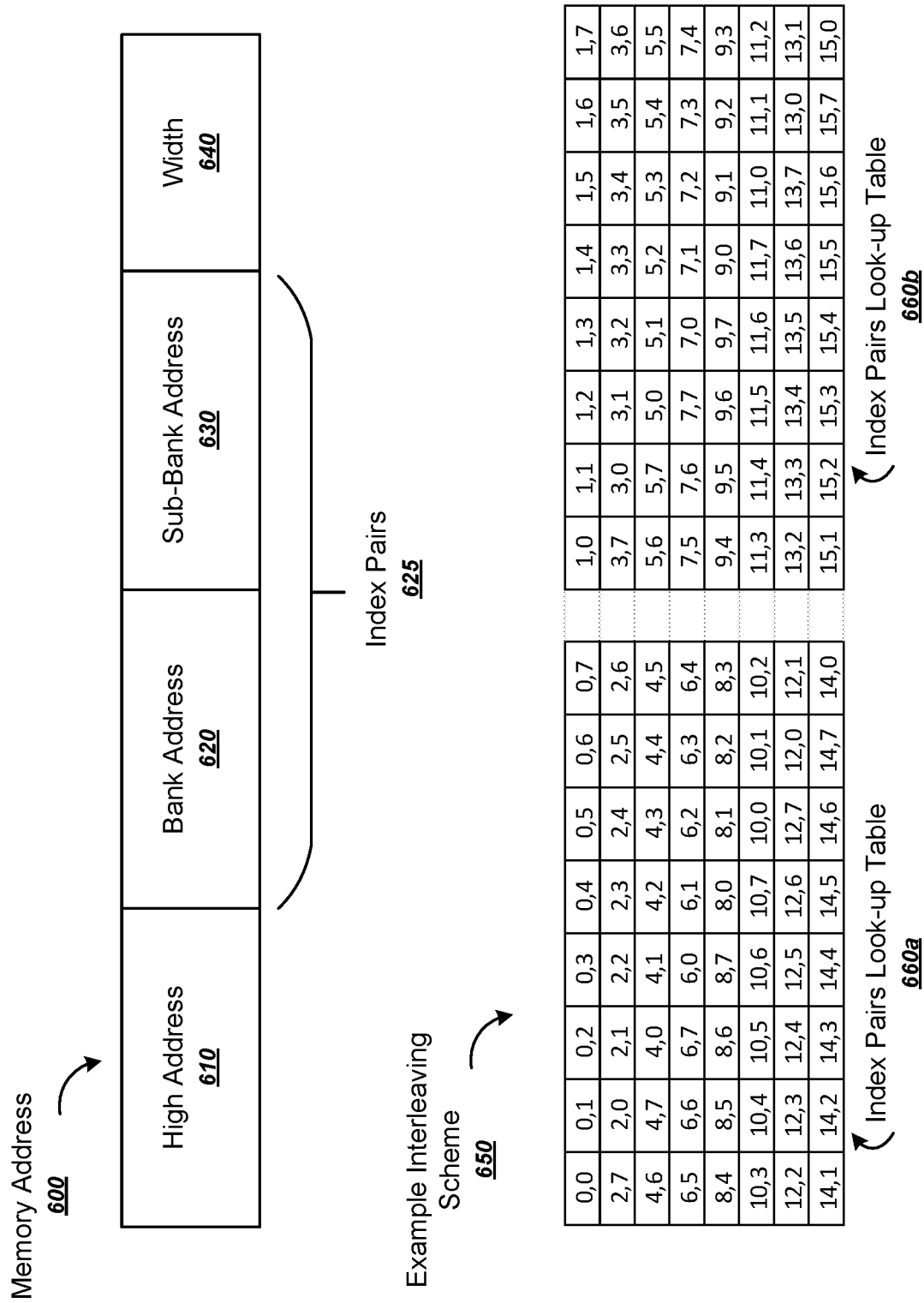
FIG. 6 illustrates an example memory interleaving scheme using logical memory banks.

FIG. 6 illustrates an example memory interleaving scheme 650 using logical memory banks.

To achieve parallel memory access at different memory banks or memory bank groups, the memory controller described in this specification, e.g., the memory controller 120 of FIG. 1, can organize and store data at different memory locations of different memory banks or memory bank groups. The memory controller can associate respective memory locations with respective memory addresses.

As shown in FIG. 6, a memory address 600 can be partitioned by the memory controller into different portions, for example, a high address portion 610, a lower address portion, and a width portion 640. The lower address portion can include a portion for indicating a memory bank address 620, and a portion following the memory bank address portion 620 for indicating a sub-bank address 630. The controller can define an index pair to characterize a memory address of a memory location in one or more memory banks or memory bank groups.

the memory controller can use multiple logical banks to manage memory addresses. Each of the logical banks can be organized as several physical sub-banks. For example, a logical bank can have 8 physical sub-banks. The memory controller can represent respective memory addresses using different pairs of indices 625 to identify different pairs of memory bank address portion 620 and sub-bank address portion 630. The index for the sub-bank address portion 630 can rotate to direct to different physical sub-banks.

In some implementations, the memory controller can determine respective memory address offsets for rotating the indices of the sub-bank addresses. For example, the memory controller can include an interleaving scheme 650 for parallel memory access. As shown in FIG. 6, a memory unit can include respective look-up tables 660a, 660b generated by a first logical bank and a second logical bank for managing memory addresses of different sets of memory banks. For example, the first look-up table 660a is configured for managing memory addresses of memory banks with even indices (e.g., 0, 2, 4, 6, 8, . . . , 14), and the second look-up table 660b is configured for managing memory addresses of memory banks with odd indices (e.g., 1, 3, 5, 7, 9, . . . , 15).

Each entry of the look-up tables 650a, 650b can represent an index pair for a corresponding memory bank and a sub-bank pair. The first index of an index pair can represent a memory bank and a bank address associated with the memory bank. The second index of an index pair can represent a memory sub-bank and a sub-bank address associated with the memory sub-bank. Each row of the look-up tables 650a, 650b can define a respective rotation scheme for the sub-banks in a separate memory bank.

Since the index pair look-up table associates indices of memory banks and sub-banks with their respective physical addresses and indices for the sub-banks in the look-up tables are logically interchangeable, the memory controller can replace malfunctioning sub-banks with functioning ones based on index pair look-up tables and the memory address translation represented in the look-up tables. An index pair look-up table can be pre-programmed based on computation requirements or memory configuration. The memory controller can use the memory address translation to replace sub-banks during run-time to maintain a consistent memory bandwidth and throughput for performing inference computations of one or more machine learning computations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a high-performance on-chip memory controller configured to control memory access to a shared memory accessible for a plurality of hardware components that are configured to perform computations, the shared memory comprising a plurality of memory bank groups, each of the memory bank groups comprising one or more memory banks, the memory controller comprising:
 at least one backside arbitration controller communicatively coupled with a memory bank group of the plurality of memory bank groups and a first hardware component of the plurality of hardware components, wherein the at least one backside arbitration controller is configured to:
  perform bus arbitrations to determine whether the first hardware component can access the memory bank group, and
  in response to determining the first hardware component can access the memory bank group, determine respective memory banks of the memory bank group for the first hardware component to access using a first memory access protocol; and
 a frontside arbitration controller communicatively coupled with the memory bank group and a second hardware component of the plurality of hardware components, wherein the frontside arbitration controller is configured to:
  perform bus arbitrations to determine whether the second hardware component can access the memory bank group; and
  in response to determining the second hardware component can access the memory bank group, determine respective memory banks of the memory bank group for the second hardware component to access using a second memory access protocol different from the first memory access protocol.

Embodiment 2 is the memory controller of embodiment 1, wherein the plurality of hardware components comprise a first group of hardware components and a second group of hardware components different from the first group of hardware components;
 wherein the first hardware component comprises one or more hardware components of the first group of hardware components; wherein the first group of hardware components comprise one or more arrays of hardware accelerators, each array of hardware accelerators comprising one or more multiplier-accumulator (MAC) units;
 wherein the second hardware component comprises one or more hardware components of the second group of hardware components, wherein the second group of hardware components comprise at least one of a central processing unit (CPU) or digital signal processing unit (DSP).

Embodiment 3 is the memory controller of embodiment 1 or 2, wherein the first memory access protocol comprises a low latency memory access protocol that is configured to reduce memory access overhead for the first hardware component, when the first hardware component performs data read and write operations to access the shared memory,
 wherein the second memory access protocol comprises a common bus protocol compatible with one or more external data buses, wherein the one or more external data buses are determined based on the second hardware component.

Embodiment 4 is the memory controller of any one of embodiments of 1-3, wherein the at least one backside arbitration controller is configured to determine different memory address offsets for one or more hardware components of the first group of hardware components to simultaneously access respective memory banks of the plurality of memory bank groups.

Embodiment 5 is the memory controller of embodiment 2, wherein the at least one backside arbitration controller is configured to perform bus arbitrations to determine a hardware component of the first group of hardware components to access the shared memory based on respective priority levels associated with the first group of hardware components; wherein the frontside arbitration controller is configured to perform bus arbitrations to determine a hardware component of the second group of hardware components to access the shared memory based on respective priority levels associated with the second group of hardware components.

Embodiment 6 is the memory controller of embodiment 5, wherein the memory controller is configured to:
 associate respective priority levels to the first and second groups of hardware components, wherein the respective priority levels associated with the first group of hardware components are higher than those associated with the second group of hardware components; and
 reorder data transactions between the plurality of hardware components and the shared memory based on the priority levels associated the plurality of hardware components.

Embodiment 7 is the memory controller of embodiment 6, wherein to reorder data transactions, the memory controller is configured to:
  determine whether a criterion is satisfied to change a priority level for a hardware component of the second group of hardware components;
  in response to determining the criterion is satisfied, boost a priority level of the hardware component for accessing the shared memory so that data transactions associated with the hardware component are prioritized, and
  reorder data transactions based at least on the boosted priority level of the hardware component.

Embodiment 8 is the memory controller of embodiment 7, wherein the frontside arbitration controller of the memory controller further comprises one or more queues configured to manage data transactions when the one or more hardware components of the second group of hardware components are accessing the shared memory; wherein the frontside arbitration controller is further configured to temporarily store data for the data transactions in the one or more queues; wherein determining whether the criterion is satisfied by the memory controller, further comprises:
  determining whether a total number of requests stored in a queue of the one or more queues exceeds a predetermined threshold value.

Embodiment 9 is the memory controller of embodiment 7, wherein determining whether the criterion is satisfied by the memory controller, further comprises:
  determining whether a timeout occurs for the hardware component to access the shared memory.

Embodiment 10 is the memory controller of any one of embodiments 2 and 4-9, wherein each hardware component of the second group of hardware components comprises respective data load and store buses, wherein the frontside arbitration controller is configured to support burst mode for one or more hardware components of the second group of hardware components to access the shared memory.

Embodiment 11 is the memory controller of any one of embodiments 2 and 4-9, wherein the first group of hardware components comprises four accelerator engines each including a plurality of arrays of hardware accelerators.

Embodiment 12 is the memory controller of any one of embodiments 2 and 4-9, wherein the second group of hardware components comprises eight agents each having advanced extensible interface (AXI) configured to communicatively couple with the frontside arbitration controller.

Embodiment 13 is the memory controller of any one of embodiments 2 and 4-9, wherein the at least one backside arbitration controller and the frontside arbitration controller are configured to perform bus arbitrations to determine respective hardware components of the first and second groups of hardware components such that an access to a memory bank group has a bandwidth of at least 512 bits (e.g., 512 bits or 1024 bits) during each memory access cycle.

Embodiment 14 is the memory controller of any one of embodiments 1-13, wherein the frontside arbitration controller is further configured to perform data compression when the second hardware component performs data load operations accessing the shared memory, and perform data decompression when the second hardware component performs data store operations accessing the shared memory;

Embodiment 15 is the memory controller of embodiment 14, wherein the frontside arbitration controller is further configured to perform the data compression or data decompression at a granularity level of 128B to facilitate random memory access.

Embodiment 16 is a system comprising one or more computers, one or more storage devices storing instructions, and the memory controller of any one of embodiments 1 to 15.

Embodiment 17 is a method performed by a high-performance on-chip memory controller, wherein the memory controller is configured to control memory access to a shared memory accessible for a plurality of hardware components that are configured to perform computations, the shared memory comprising a plurality of memory bank groups, each of the memory bank groups comprising one or more memory banks, the method comprising:
  communicatively coupling at least at least one backside arbitration controller to a memory bank group of the plurality of memory bank groups and a first hardware component of the plurality of hardware components, wherein the at least one backside arbitration controller is configured to:
    perform bus arbitrations to determine whether the first hardware component can access the memory bank group, and
    in response to determining the first hardware component can access the memory bank group, determine respective memory banks of the memory bank group for the first hardware component to access using a first memory access protocol; and
  communicatively coupling a frontside arbitration controller to the memory bank group and a second hardware component of the plurality of hardware components, wherein the frontside arbitration controller is configured to:
    perform bus arbitrations to determine whether the second hardware component can access the memory bank group; and
    in response to determining the second hardware component can access the memory bank group, determine respective memory banks of the memory bank group for the second hardware component to access using a second memory access protocol different from the first memory access protocol.

Embodiment 18 is a computer storage medium encoded with a computer program, the program comprising instructions that are operable, when executed by data processing apparatus, to cause the data processing apparatus to perform the method of embodiment 17.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. An on-chip memory controller configured to control memory access to a shared memory accessible for a plurality of hardware components that are configured to perform computations, the shared memory comprising a plurality of memory bank groups, each of the memory bank groups comprising one or more memory banks, the memory controller comprising:
  a first arbitration controller communicatively coupled with a memory bank group of the plurality of memory bank groups, using a first data bus, and a first group of hardware components of the plurality of hardware components, using a second data bus, wherein a first arbitration controller and hardware components of the first group of hardware components are communicatively coupled using a first memory access protocol, wherein a first arbitration controller is configured to:
    perform bus arbitrations to determine whether a first hardware component of the first group of hardware components can access the memory bank group, wherein the determination is based at least in part on a priority level associated with the first hardware component, and
    in response to determining that the first hardware component can access the memory bank group, determine respective memory banks of the memory bank group for the first hardware component to access using the first memory access protocol; and
  a second arbitration controller communicatively coupled with the memory bank group, using a third data bus, and a second group of hardware components of the plurality of hardware components, using a fourth data bus, wherein the second arbitration controller and hardware components of the second group of hardware components are communicatively coupled using a second memory access protocol distinct from the first memory access protocol, the second memory access protocol including an advanced extensible interface (AXI), wherein the third data bus and fourth data bus are distinct from the first data bus and the second data bus, and wherein the second arbitration controller is configured to:
    perform bus arbitrations to determine whether a second hardware component of the second group of hardware components can access the memory bank group, wherein the determination is based at least in part on a priority level associated with the second hardware component; and
    in response to determining that the second hardware component can access the memory bank group, determine respective memory banks of the memory bank group for the second hardware component to access using the second memory access protocol,
  wherein the memory controller generates instructions for the first hardware component and the second hardware component, determined by the respective bus arbitrations, to access the memory bank group based on the respective priorities of the first hardware component and the second hardware component.

2. The memory controller of claim 1, wherein the plurality of hardware components comprise the first group of hardware components including one or more hardware components and the second group of hardware components including one or more hardware components, wherein the one or more hardware components of the first group of hardware components are distinct from the one or more hardware components of the second group of hardware components;
  wherein the first group of hardware components comprise one or more arrays of hardware accelerators, each array of hardware accelerators comprising one or more multiplier-accumulator (MAC) units;
  wherein the second group of hardware components comprise at least one of a central processing unit (CPU) or digital signal processing unit (DSP).

3. The memory controller of claim 1, wherein a data bus between a first arbitration controller and the memory bank group has a width of at least 512 bits, and
  wherein a data bus between the second arbitration controller and the memory bank group has a width of at least 512 bits.

4. The memory controller of claim 2, wherein a first arbitration controller is configured to determine different memory address offsets for one or more hardware components of the first group of hardware components to simultaneously access respective memory banks of the plurality of memory bank groups.

5. The memory controller of claim 2, wherein a first arbitration controller is configured to perform bus arbitrations to determine a hardware component of the first group of hardware components to access the shared memory based on respective priority levels associated with the first group of hardware components; wherein the second arbitration controller is configured to perform bus arbitrations to determine a hardware component of the second group of hardware components to access the shared memory based on respective priority levels associated with the second group of hardware components.

6. The memory controller of claim 5, wherein the memory controller is configured to: associate the respective priority levels to the first and second groups of hardware components, wherein the respective priority levels associated with the first group of hardware components are higher than those associated with the second group of hardware components; and
  reorder data transactions between the plurality of hardware components and the shared memory based on the priority levels associated with the plurality of hardware components.

7. The memory controller of claim 6, wherein to reorder data transactions, the memory controller is configured to:
  determine whether a criterion is satisfied to change a priority level for the hardware component of the second group of hardware components;

in response to determining that the criterion is satisfied, boost a priority level of the hardware component of the second group of hardware components for accessing the shared memory so that data transactions associated with the hardware component of the second group of hardware components are prioritized, and reorder data transactions based at least on the boosted priority level of the hardware component of the second group of hardware components.

8. The memory controller of claim 7, wherein the second arbitration controller of the memory controller further comprises one or more queues configured to manage data transactions when the one or more hardware components of the second group of hardware components are accessing the shared memory; wherein the second arbitration controller is further configured to temporarily store data for the data transactions in the one or more queues; wherein determining whether the criterion is satisfied by the memory controller, further comprises:

determining whether a total number of requests stored in a queue of the one or more queues exceeds a predetermined threshold value.

9. The memory controller of claim 7, wherein determining whether the criterion is satisfied by the memory controller, further comprises:

determining whether a timeout occurs for the hardware component of the second group of hardware components to access the shared memory.

10. The memory controller of claim 2, wherein each hardware component of the second group of hardware components comprises respective data load and store buses, wherein the second arbitration controller is configured to support burst mode for one or more hardware components of the second group of hardware components to access the shared memory.

11. The memory controller of claim 2, wherein the first group of hardware components comprises four arrays of hardware accelerators.

12. The memory controller of claim 2, wherein the second group of hardware components comprises eight hardware components, each of the eight hardware components communicatively coupled with the second arbitration controller using a respective advanced extensible interface (AXI).

13. The memory controller of claim 2, wherein, in response to the bus arbitrations performed by the first arbitration controller:

determining the first hardware component of the first group of hardware components to access a memory bank group of the plurality of memory bank groups;

issuing, by the first arbitration controller, at least one instruction for the first hardware component of the first group of hardware components to access a particular memory bank group of the plurality of memory bank groups with at least a 1024 bit width during each memory access cycle.

14. The memory controller of claim 1, wherein the second arbitration controller is further configured to perform data compression when the second hardware component performs data load operations accessing the shared memory, and perform data decompression when the second hardware component performs data store operations accessing the shared memory.

15. The memory controller of claim 14, wherein the second arbitration controller is further configured to perform the data compression at a granularity level of 128B or data decompression at a granularity level of 128B to facilitate random memory access.

16. A method performed by an on-chip memory controller, wherein the memory controller is configured to control memory access to a shared memory accessible for a plurality of hardware components that are configured to perform computations, the shared memory comprising a plurality of memory bank groups, each of the memory bank groups comprising one or more memory banks, the method comprising:

communicatively coupling at least a first arbitration controller to a memory bank group of the plurality of memory bank groups, using a first data bus, and a first group of hardware components of the plurality of hardware components, using a second data bus, wherein a first arbitration controller and hardware components of the first group of hardware components are communicatively coupled using a first memory access protocol, wherein a first arbitration controller is configured to:

perform bus arbitrations to determine whether a first hardware component of the first group of hardware components can access the memory bank group, wherein the determination is based at least in part on a priority level associated with the first hardware component, and in response to determining that the first hardware component can access the memory bank group, determine respective memory banks of the memory bank group for the first hardware component to access using the first memory access protocol;

communicatively coupling a second arbitration controller to the memory bank group using a third data bus, and a second group of hardware components of the plurality of hardware components, using a fourth data bus, wherein the second arbitration controller and hardware components of the second group of hardware components are communicatively coupled using a second memory access protocol distinct from the first memory access protocol, the second memory access protocol including an advanced extensible interface (AXI), wherein the third data bus and fourth data bus are distinct from the first data bus and the second data bus, and wherein the second arbitration controller is configured to:

perform bus arbitrations to determine whether a second hardware component of the second group of hardware components can access the memory bank group, wherein the determination is based at least in part on a priority level associated with the second hardware component; and in response to determining that the second hardware component can access the memory bank group, determine respective memory banks of the memory bank group for the second hardware component to access using a second memory access protocol different from the first memory access protocol; and generating instructions for the first hardware component and the second hardware component, determined by the respective bus arbitrations, to access the memory bank group based on the respective priorities of the first hardware component and the second hardware component.

17. The method of claim 16, wherein the plurality of hardware components comprise the first group of hardware components including one or more hardware components and the second group of hardware components including one or more hardware components, wherein the one or more hardware components of the first group of hardware components are distinct from the one or more hardware components of the second group of hardware components;

wherein the first group of hardware components comprise one or more arrays of hardware accelerators, each array of hardware accelerators comprising one or more multiplier-accumulator (MAC) units;

wherein the second group of hardware components comprise at least one of a central processing unit (CPU) or digital signal processing unit (DSP).

18. The method of claim 17, wherein a first arbitration controller is configured to perform bus arbitrations to determine a hardware component of the first group of hardware components to access the shared memory based on respective priority levels associated with the first group of hardware components; wherein the second arbitration controller is configured to perform bus arbitrations to determine a hardware component of the second group of hardware components to access the shared memory based on respective priority levels associated with the second group of hardware components.

19. The method of claim 18, further comprising:
associating the respective priority levels to the first and second groups of hardware components, wherein the respective priority levels associated with the first group of hardware components are higher than those associated with the second group of hardware components; and reordering data transactions between the plurality of hardware components and the shared memory based on the priority levels associated with the plurality of hardware components.

20. The method of claim 19, wherein reordering data transactions comprises:
determining whether a criterion is satisfied to change a priority level for the hardware component of the second group of hardware components;

in response to determining that the criterion is satisfied, boosting a priority level of the hardware component of the second group of hardware components for accessing the shared memory so that data transactions associated with the hardware component of the second group of hardware components are prioritized, and reordering data transactions based at least on the boosted priority level of the hardware component of the second group of hardware components.

* * * * *